Jan. 19, 1926.
J. W. HORTON
1,570,490
SOUND REPRODUCING METHOD AND APPARATUS
Filed July 31, 1923
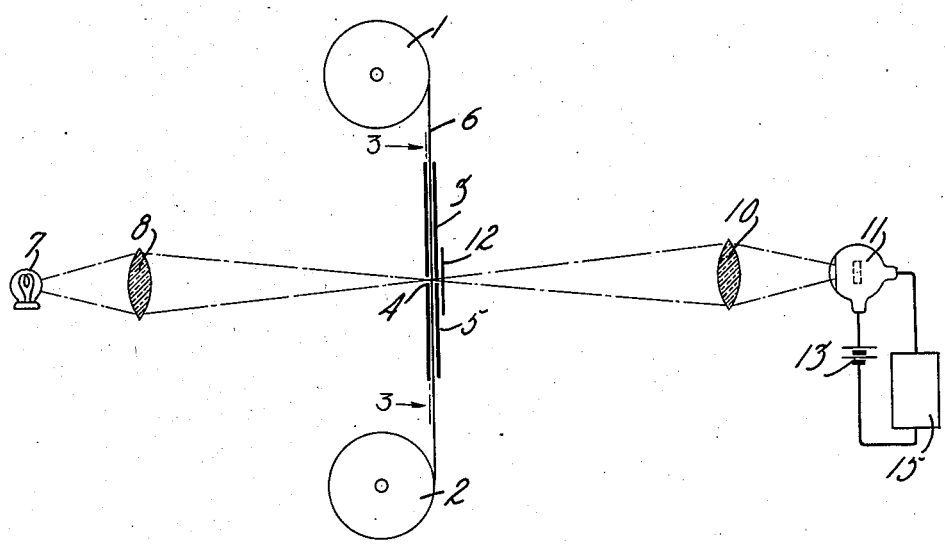
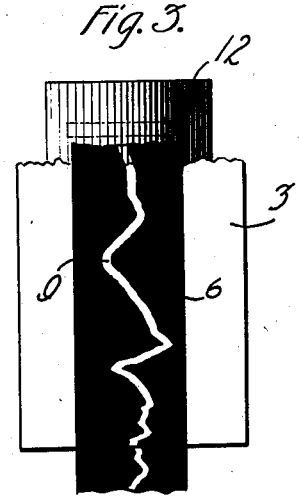
Inventor:
Joseph W. Horton
by Jos. C.R. Palmer Atty.

Patented Jan. 19, 1926.

1,570,490

UNITED STATES PATENT OFFICE.

JOSEPH W. HORTON, OF BLOOMFIELD, NEW JERSEY, ASSIGNOR TO WESTERN ELECTRIC COMPANY, INCORPORATED, OF NEW YORK, N. Y., A CORPORATION OF NEW YORK.

SOUND-REPRODUCING METHOD AND APPARATUS.

Application filed July 31, 1923. Serial No. 654,916.

*To all whom it may concern*:

Be it known that I, JOSEPH W. HORTON, a citizen of the United States, residing at Bloomfield, in the county of Essex, State of New Jersey, have invented certain new and useful Improvements in Sound-Reproducing Methods and Apparatus, of which the following is a full, clear, concise, and exact description.

This invention relates to sound reproducing methods and apparatus and particularly to a method and apparatus for reproducing sound from a record of the type which is usually produced photographically.

The object of the invention is in general to provide a convenient method and apparatus for reproducing sound from a record in the form of an oscillograph trace of constant width.

A convenient way of recording sound is by means of an oscillograph, the current supplied to the vibrator being modulated by the sound to be recorded. By this means a film record may be produced in the form of a serpentine trace of constant width, distance along the length of the film corresponding to time and the lateral position of the trace on the film corresponding to the instantaneous intensity of the sound. The negative of such a record is in the form of an opaque serpentine trace on a transparent background, and the positive is in the form of a transparent serpentine trace on an opaque background.

In accordance with the general features of this invention, sound is reproduced from a record of this type by moving the record across the path of a beam of light which passes through the transparent portion of the film and falls upon a photo-electric cell connected to the sound reproducing mechanism. Interposed between the source of light and the photo-electric cell is an element which varies the intensity of the beam of light in accordance with the transverse positions of the trace on the film, thus causing the photo-electric cell to produce an electric current varying in accordance with the sound recorded.

Referring to the drawings, Fig. 1 is a schematic diagram showing the invention in elevation; Fig. 2 is a plan view of the sound record; and Fig. 3 is an enlarged fragmentary section taken on a line 3—3 of Fig. 1.

The film 6 having sound recorded thereon is passed at uniform speed from reel 1 to reel 2 by any suitable mechanism (not shown). Intermediate the reels the film passes through a flat tubular guide 3 having directly alined slots 4 and 5 which run transversely of the film 6. A beam of light from a source 7 is focused by lens 8 upon the film where it passes between slots 4 and 5; and the portion of the beam 12 which is transmitted by the transparent trace 9 (see Fig. 3) of the film is focused by lens 10 upon photo-electric cell 11. By "photoelectric cell" is meant any device which has an electrical characteristic changed by variation in intensity of light falling upon it. Adjacent to guide 3 is an element 12 which is nearly transparent at its left hand edge and nearly opaque at its right hand edge as indicated by the shading in Fig. 3. The transparency of this element varies progressively from the left-hand edge to the right-hand edge and hence the proportion of a beam of light which it transmits depends upon the lateral position at which the beam strikes this element 12. For this reason element 12 is conveniently termed a "light absorbing wedge." It may be made in any suitable manner, such as for example, exposing a photographic plate so that it will have the desired gradation of transparency when it is developed.

Film 6 as it moves past alined slots 4 and 5 allows a constant amount of light from source 7 to be transmitted but the position of the transmitted beam of light is varied laterally with respect to light absorbing wedge 12, and hence the intensity of the beam of light as it emerges from the light absorbing wedge is varied in accordance with the lateral position of the trace upon the film. Due to this variation in intensity of the beam of light, the effective impedance of photo-electric cell 11 is correspondingly varied as is well understood in the art; and hence battery 13 supplies a pulsating current to a suitable sound producing apparatus 15 thereby causing it to reproduce the sound recorded upon the film. The reproducing apparatus 15 may be of any suitable and well known from such as a telephone or loud speaking receiver.

Obviously, the variation in the density of the light absorbing wedge from one edge to the other may be made to follow any suitable function. If this element is made from a photographic plate, the transparency can be made to follow any desired function by suitably exposing the plate prior to development. If the lateral position of the trace on the sound record is a linear function of the instantaneous intensity of the sound recorded, and the pulsating current produced by the photo-electric cell is a linear function of the intensity of the beam of light acting upon it, the variation in the amount of light absorbed by the wedge should be a linear function of the lateral position at which the beam of light strikes the wedge. However, if there are any non-linear characteristics in the recording apparatus or in the photo-electric cell, the density of the light absorbing wedge may be modified accordingly so that it will not be a linear function of the distance from the edge of the wedge, but will be such function as will compensate for the non-linear characteristics of the recording apparatus or the photo-electric cell, or both, so that the sound produced by apparatus 15 will be a true undistorted reproduction of the original.

The invention claimed is:

1. The method of reproducing sound from a record in the form of a transparent oscillographic trace of substantially constant width on an opaque background, which comprises varying the intensity of a beam of light as a time function of the lateral position of the trace on the background, and varying the value of an electric current as a function of the intensity of the beam of light.

2. The method of reproducing sound from a record in the form of a transparent oscillographic trace of substantially constant width on an opaque background, which comprises varying the intensity of a beam of light in accordance with the lateral position of the trace on the background, and varying the value of an electric current in accordance with the intensity of the beam of light.

3. The method of reproducing sound from a record in the form of a transparent oscillographic trace of substantially constant width and transparency on an opaque film, which comprises varying the intensity of a beam of light as a time function of the transverse position of the trace on the film, varying the value of an electric current as a function of the intensity of the beam of light, and converting the current into sound waves.

4. A sound reproducing apparatus, comprising a movable partially transparent sound record, a source of light illuminating one side of said sound record, a photo-electric cell positioned to be influenced by light transmitted by said sound record, and a light absorbing wedge intermediate said source and said photo-electric cell.

5. A sound reproducing apparatus, comprising a movable sound record having an oscillographic trace of constant width, a source of light arranged to cause a beam of light to be influenced by the trace on said sound record, a photo-electric cell for receiving said beam of light after it has been influenced by said sound record, and a light absorbing wedge for modifying the intensity of said beam of light before it reaches said photo-electric cell.

6. A sound reproducing apparatus, comprising a movable partially transparent sound record, a source of light illuminating one side of said sound record, means for focusing the light from said source upon said sound record, a photo-electric cell, means for focusing the light transmitted by said sound record upon said photo-electric cell, and a light absorbing wedge to modify the intensity of the light striking said photo-electric cell.

7. A sound reproducing aparatus, comprising a movable sound record having a transparent trace of constant width, a source of light illuminating one side of said sound record, a photo-electric cell positioned to be influenced by light transmitted by said sound record and a light absorbing wedge intermediate said source and said sound record.

In witness whereof, I hereunto subscribe my name this 24 day of July, A. D., 1923.

JOSEPH W. HORTON.